Nov. 21, 1933.   R. AMBRONN   1,936,321
PROCESS OF AND DEVICE FOR DETECTING AND MEASURING MINIMUM ACCELERATIONS
Filed June 15, 1926
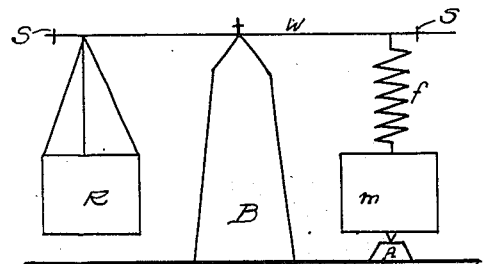
Fig.1
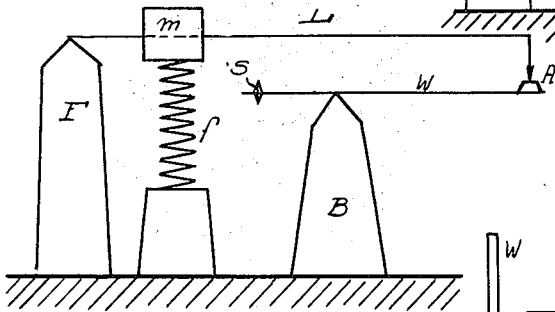
Fig.2
Fig.3
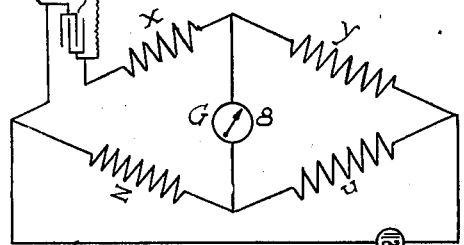
Fig.4
Inventor:
Richard Ambronn
Jno. Smithie
Attorney:

Patented Nov. 21, 1933

1,936,321

UNITED STATES PATENT OFFICE 1,936,321

PROCESS OF AND DEVICE FOR DETECTING AND MEASURING MINIMUM ACCELERATIONS

Richard Ambronn, Gottingen, Germany

Application June 15, 1926, Serial No. 116,246, and in Germany July 13, 1925

3 Claims. (Cl. 177—351)

The present invention concerns a process and devices for indicating and measuring the temporary course of slight accelerations occurring in underground explorations, said process and devices being based upon the methods and instruments applied in the known seismographs, such as for instance the method of Grunmach (Physikalische Zeitschrift) (Band 10, 1909 und Experimentaluntersuchung zur Messung von Erderschutterungen, Verhandlungen des Vereins zur Forderung des Gewerbefleisses, 1913, Heft 2–5), but providing more precise measurings and allowing measurings of very minute and slight accelerations which cannot be detected in the actual state of the art.

The measuring of slight accelerations is needed in such apparatus as seismographs and in geological work, for instance to investigate and ascertain the elastic properties of the underground. For investigations of this latter kind, an explosion is produced at a given point underground and the speed of propagation of the percussion of the explosion wave in different directions around said given point is measured which gives the precise value of the elasticity of the subsoil in each direction. Such measurings are effected by means of instruments which are placed at given distances in different directions around said point and in which a slight acceleration of some parts in respect to others can be detected and recorded at the instant the first percussion or explosion wave passes.

The main object of my invention is therefore a process and an apparatus capable of detecting a most slight acceleration, imparted in respect to a small mass mounted in the apparatus, through even a slight vibration or percussion travelling in the ground upon which the base of the apparatus is firmly seated, such as occurs when an explosion has taken place some distance away or such as are caused by seismic shocks, and another object of my invention is an apparatus which may be used as a seismograph.

By the known method of Grunmach, a resiliently suspended mass is set so as to exert on a fixed support a determined pressure. If the whole apparatus be then submitted to an acceleration in the direction of said pressure on the support, the measuring of said acceleration will be based on the fact that the mass will lose contact with said support, on condition however that said acceleration has higher value than the acceleration due to gravitation. This is a limitation to Grunmach's method and apparatus. Moreover, this known simple method for measuring accelerations cannot be used for measuring very small and slight accelerations, because it is impossible to set with the required exactness the very low contact pressure and maintain such low pressure temporarily constant at a fraction of a millionth of the attracting force exerted by the earth on the mass, the force exerted on the mass by the spring, to which the mass is bound. The variations of the forces exerted by the springs and due to thermic influences, subsequent consequences resulting from such influences, changes on the contact surfaces between mass and support and the like influences produce changes of the pressure which exceed by far the admissible limits, as experience has proved.

Now my invention has for its aim to provide a method and devices to overcome the above mentioned difficulties and to carry out the measuring of the accelerations in a very simple manner, as will be hereinafter described.

It will be assumed that the accelerations which have to be measured are of such a nature that they consist of waves having very short periods in comparison with the period of oscillation proper of the different elements constituting the apparatus herein described, in order that the oscillations which may be set up in the said apparatus do not interfere with the measurements.

The accompanying drawing shows different constructive forms of the device used for detecting, indicating and registering the acceleration waves acting on the contact point between the mass and its support.

Figs. 1 to 3 show constructive forms of the arrangement of the mass with respect to the balance.

Figure 4 illustrates a means for detecting and measuring variations of current.

In Fig. 1 the mass $m$ with its resiliently connected spring $f$ is suspended from the beam W of the balance B, and is equilibrated by a corresponding weight R or any electro-magnetic or the like force at the other end of the beam. The contact pressure of the mass $m$ on the rigid support A is regulated by an additional, adjustable weight on the balance such as a screw S at each end of the beam. If the resiliency of the spring $f$ undergoes physical changes, the beam W swings correspondingly on its pivot, which latter substantially coincides with the center of gravity, and the pressure of $m$ against A keeps always constant. If the whole device is submitted to acceleration waves such as occur in seismic shocks and having the acceleration value $d$, these shocks which are directed as pressure P are transmitted to the resiliently suspended mass and to the support A and the contact pressure P varies according to the value $m \times b$ (mass multiplied by the acceleration) and eventually the mass $m$ may be raised and separated from the support A, and this will allow detecting and measuring said acceleration waves by arranging an electrical circuit with contact between members $m$ and A and measuring the current which passes therebetween, of which a method is given below. The difference between my method and apparatus and Grunmach's resides mainly in that the spring $f$ according to my invention has for its sole object to resiliently bind to a desired degree mass $m$ but not to adjust pressure P; this is done according to my invention by the adjustable weights on beam W, namely screws S. The apparatus is set with the balance beam first in indifferent equilibrium on its central pivot, then a minute additional weight is added on the right side by screwing one or both screws S slightly to the right which provides small pressure P of $m$ on A; now the weight of mass $m$ and spring $f$ is, by abstracting said minute additional weight on the right, equal to the weight of R and the acceleration due to gravitation on the one side of the balance beam is counterbalanced by the same effect on the other side. I have thus eliminated in my apparatus the effect of gravitation on mass $m$, which was a limitation to the method of Grunmach. The slight pressure P may of course be provided in any other convenient way such as applying small additional lamella on top of weight R.

Fig. 2 shows an arrangement in which the spring $f$ carrying the mass $m$ is fixed on a rigid fixed part F, whereas the support A is secured to one end of a beam W.

Fig. 3 shows a still further arrangement in which beam balances with unequal arms are used and whereby the mass $m$ is not disposed for directly acting on its support, but rather by the intermediary of a magnifying lever arm L, which arrangement is of course known per se. Both arrangements according to Figs. 2 and 3 work in substantially the same way as described in reference to Fig. 1. Screw S is always provided for regulating a very small contact pressure on A. All these arrangements are provided for detecting and measuring acceleration waves directed vertically.

Fig. 4 shows a means for detecting and measuring the variations of current passing between A and $m$ schematically illustrated, said current being produced by a device E and measured in a Wheatstone bridge, i. e. a galvanometer G bridged between resistances $x$, $y$, $z$ and $u$. The oscillatons of the index of the galvanometer indicates variations of contact pressure between A and $m$, and therefore oscillation waves acting on the device. L' indicates a capacity or condenser mounted across the contact A—$m$ for causing better detection of the variations of current therebetween. One may record, as is well known in recording instruments of this kind, the oscillations of the index of the galvanometer on a film.

Evidently, such arrangements may be varied without departing from the principle of the invention, consisting in the use of a beam balance as above stated, in order to regulate the contact pressure at A.

The duration of the natural vibrations of the registering instrument intended to indicate at every instant the electric conditions on the contact A should be very short in order to enable same to instantaneously follow the electric changes occurring at the contact A and it should furthermore be very sensitive so that the current load on the contact point may become very low in order to space the contact pieces.

What is claimed is,

1. A means of detecting and measuring minute accelerations, comprising a contact piece on a spring balance and another contact piece on a beam balance, a connection between said contact pieces and a suitable electric circuit, and a measuring means inserted in said circuit 2. An apparatus for detecting and measuring minute accelerations arising in an acceleration field consisting in a mass freely carried by a support, a spring for equilibrating the weight of the mass on the said support, and a beam balance combined with said mass and spring so that the forces resulting on the said supporting point are due only to the accelerations of the mass, and means for detecting the said forces.

3. An improved apparatus for detecting and measuring the size and moment of production of minute accelerations, which consists in a mass suspended by means of an elastic spring from a fixed support, a contact piece on said mass causing the same to rest on one end of the beam of a double armed balance, an anvil on one end of the balance beam, and means for adjusting the equilibrium of the balance to control the pressure of the contact piece on the mass acting on said anvil.

RICHARD AMBRONN.